May 2, 1939. T. I. MEANS 2,156,507
BED
Filed Aug. 20, 1937
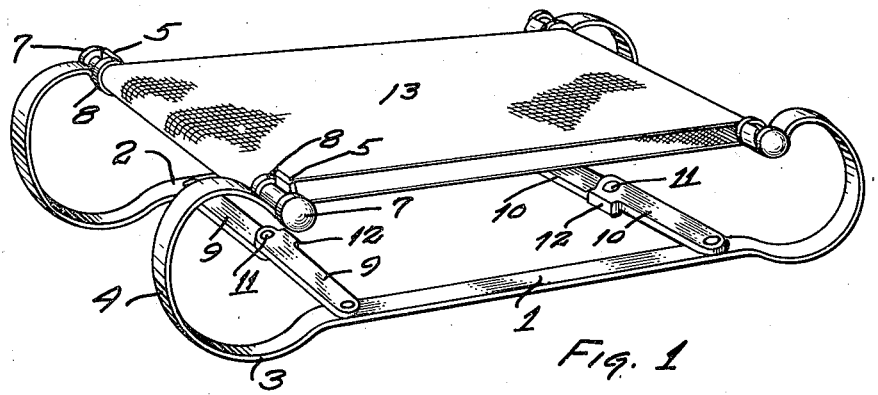
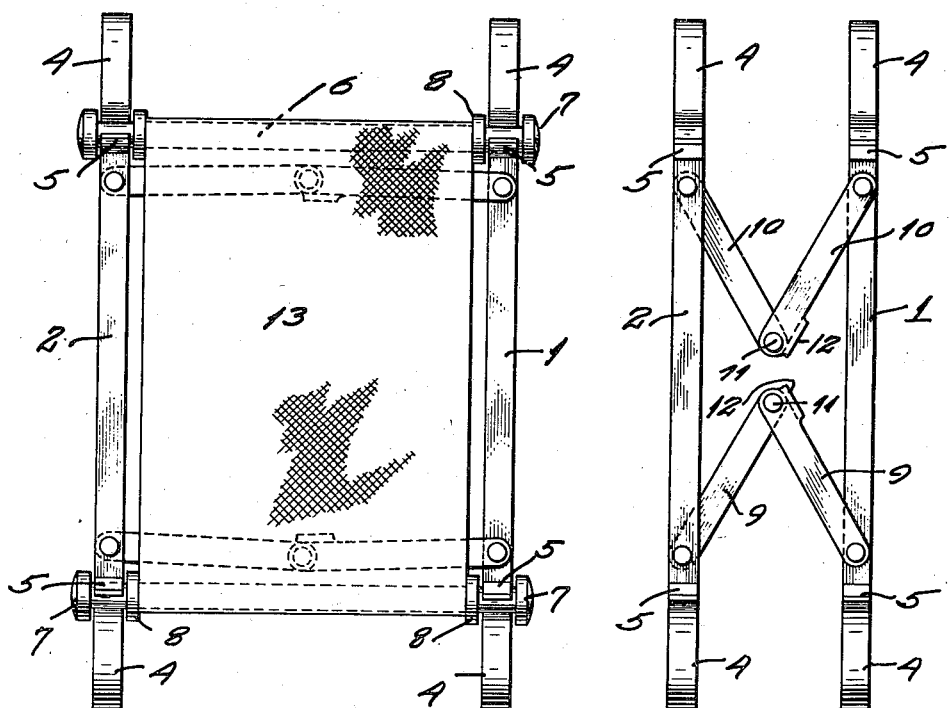
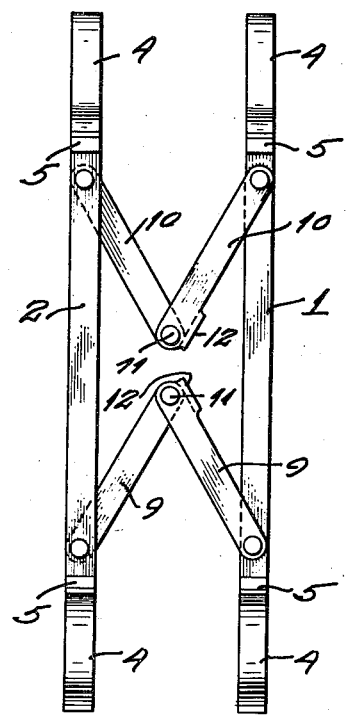
INVENTOR.
TRUMAN I. MEANS
BY
J. S. Carpenter
ATTORNEY.

Patented May 2, 1939

2,156,507

UNITED STATES PATENT OFFICE 2,156,507

BED

Truman I. Means, Santa Fe, N. Mex.

Application August 20, 1937, Serial No. 160,101

3 Claims. (Cl. 119—1)

This invention relates to improvements in beds for dogs, cats and other animals and has as its object the provision of such a structure which is strong, substantial but sufficiently yieldable to provide a comfortable bed for the animal.

Another object of the invention is to provide a bed comprising an endless apron or sheet upon which the animal rests and a frame supporting the sheet in such a manner that a new portion of the sheet may be placed in use from day to day, or when necessity demands, without removing the sheet from the frame.

A further object of the invention is to provide a bed in which the yieldable portion will always be held taut against undue stretching and which cannot be disarranged by the animal when scratching or pawing and yet providing a comfortable rest for its body.

Further objects of the invention will hereinafter appear, and to all of these ends the invention consists of the features of construction, arrangement of parts, and combination of elements, substantially as hereinafter fully described and claimed in the specification and shown in the accompanying drawing, in which:

Figure 1 is a perspective view of the bed constructed in accordance with the invention.

Figure 2 is top plan view.

Figure 3 is a view showing the sheet removed and the frame partly folded.

Figure 4 is a view showing one of the rollers which support the endless sheet.

Briefly, the invention about to be described consists of a pair of side members constructed of rather rigid, yet yieldable, material, particularly at their end portions where they are folded back upon themselves to provide a gooseneck. The ends of the goosenecks are somewhat elevated and are cupped to receive a cross bar at each end. The cross bar is in the form of a roller and has passing thereover an endless sheet or apron formed of canvas or the like, and upon which the animal may rest.

In addition to the cross bars the side frames are held apart by pivoted arms with break joints as hereinafter described, and which are of such a structure as to permit their swinging slightly beyond the true line from pivot to pivot, thus locking the frame in extended position.

With this structure it is obvious that any animal resting upon the apron or sheet will have a comfortable and resilient support for its body, the resiliency and yielding action of the apron or sheet being provided by the goosenecks previously referred to.

Referring now to the drawing in detail, the numerals 1 and 2 designate side members formed of suitable metal or the like, the major portion of each lying in a true straight line and with its end portions slightly curved downwardly to form a button or a rest for the side member as indicated at 3, then upwardly to form a substantial gooseneck 4. In the case of larger animals it may be necessary to provide a substantially rigid bar, and to provide the resiliency desired the goosenecks may be formed of an extended portion of the bar slightly reduced in cross section.

The extreme end portion of each gooseneck is then curved upwardly as indicated at 5 to form a resilient clip for the reception of a cross bar or rod 6. The cross bar 6 is provided with enlarged heads 7 at each end and adjacent such heads are collars 8, thus providing a suitable space for the reception of the clips 5 formed on the gooseneck.

To hold the side members 1 and 2 in an extended relation and to prevent them from contracting when the animal is resting upon the sheet, suitable arms 9 and 10 are pivoted to each side member. The arms 9 and 10 are connected at their extreme end portions by pins 11. One set of the arms 9 and 10 are provided with downwardly extending lips 12 which abut and overhang the extended portion of the corresponding arms 9 and 10 to which it is pivotally connected, thus forming in reality a lock for the arms when they are swung to a position slightly out of line as indicated by the dotted line in Figure 2.

Supported by the rods 6 is an endless apron or sheet 13 formed of canvas, or like material, and of such a length as to be held taut by the yielding action of the goosenecks.

By reason of the construction herein described the pivoted arms maintaining in spaced relation the side members may be folded as shown in Figure 3 upon the removal of the cross rods 6 and the apron 13, thus permitting the side members to be brought together in a very compact relation. The apron then is folded and rolled about the rods. The result being that the entire bed may be folded up and stored in a very small space when not in use.

It is apparent that with a bed of this construction that merely by turning one of the rods by hand a clean portion of the apron or sheet may be exposed for the animal, and when necessity demands the rods may be removed from the ends of the goosenecks, the sheet removed from the rods, and then a new apron or sheet may then be substituted or the old one may be washed.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. An animal bed comprising a pair of longitudinally extending side members each formed of a single piece of spring metal with gooseneck end portions extending upwardly and rearwardly and terminating in reversely curved end clips, a pair of transversely extending rollers having end portions adapted to be removably seated in the end clips of the side members, an endless apron passing around said rollers, and means to hold the side members in parallel spaced relationship when the bed is assembled.

2. An animal bed comprising a pair of longitudinally extending side members each formed of a single piece of spring metal with gooseneck end portions extending upwardly and rearwardly and terminating in reversely curved end clips, a pair of transversely extending rollers having end portions adapted to be removably seated in the end clips of the side members, means on the rollers to prevent slidable movement thereof through the clips, and connecting means between the uncurved portions of the side members to hold them in parallel spaced relationship.

3. An animal bed comprising a pair of longitudinally extending side members each formed of a single piece of spring metal with gooseneck end portions extending upwardly and rearwardly and terminating in reversely curved end clips, a pair of transversely extending rollers having end portions adapted to be removably seated in the end clips of the side members, means on the rollers to prevent slidable movement thereof through the clips, and hinged connections between the uncurved portions of the side members to hold them rigidly spaced in one position and to permit them to be folded toward each other when the bed is disassembled.

TRUMAN I. MEANS.